United States Patent [19]

Vadasz et al.

[11] Patent Number: 5,062,451
[45] Date of Patent: Nov. 5, 1991

[54] MAXIMUM FLOW SINGLE PLUG RETENTION VALVE

[75] Inventors: Amnon M. Vadasz, San Antonio de Los Altos; Jesus E. Chacin, Caracas, both of Venezuela

[73] Assignee: Intevep, S.A., Caracas, Venezuela

[21] Appl. No.: 588,341

[22] Filed: Sep. 26, 1990

[51] Int. Cl.$^5$ ............................................... F16K 15/06
[52] U.S. Cl. .................................. 137/533.17; 137/528
[58] Field of Search ............... 137/533, 533.17, 533.29, 137/540, 528

[56] References Cited

U.S. PATENT DOCUMENTS

| | | | |
|---|---|---|---|
| 1,873,782 | 8/1932 | Nixon | 137/533.17 X |
| 2,670,922 | 3/1954 | Carlisle | 137/540 |
| 2,886,058 | 5/1959 | Horton | 137/540 X |
| 2,930,401 | 3/1960 | Cowan | 137/540 |

Primary Examiner—Robert G. Nilson
Attorney, Agent, or Firm—Bachman & LaPointe

[57] ABSTRACT

A single plug check valve for use in a process for pumping a two phase mixture is designed in such a manner as to minimize pressure drop across the valve thereby maximizing the flow of fluid through the valve body.

4 Claims, 2 Drawing Sheets

MAXIMUM FLOW SINGLE PLUG RETENTION VALVE

BACKGROUND OF THE INVENTION

The present invention is drawn to a check valve and, more particularly, a single plug check valve employed in a pumping unit for pumping crudes and the like wherein the valve plug of the check valve has a specific design which guarantees minimum pressure drop across the valve and thus maximum flow through the valve body.

In the petroleum industry positive displacement pumps are used in numerous applications including the pumping of crudes from subsurface wells. Typical positive displacement pumps used in the petroleum industry employ intake and discharge valves which are typically check valves which comprise a valve seat onto which a ball rests and seals against the valve seat. A typical positive displacement pump is disclosed for example in U.S. Pat. No. 4,018,547.

The typical check valve configuration is very efficient when pumping liquids. However, it has been found that if a reciprocating positive displacement pump is used to pump a two phase mixture, that is, a gas-liquid mixture, the pumping efficiency rapidly decreases as the gas content of the two phase mixture increases. It is quite common in the petroleum industry when pumping crude from subsurface wells to have a gas entrained in the crude. In order to maximize pumping efficiency when pumping a two phase mixture with a reciprocating positive displacement pump, it has been found that typical check valves as discussed above are unsatisfactory.

In order to increase pumping efficiency it has been found that the valves employed should offer a minimum restriction to flow through them as a large restriction would produce an increase in pressure drop across the valves which in turn causes part of the liquid phase of the two phase mixture to flash into the gaseous phase which results in a further decrease in the efficiency of the pumping operation. This phenomena occurs when employing downhole reciprocating pumps to extract oil from underground reservoirs. In addition, a critical condition known as gas lock is a common occurrence in oil field operations and the origin of this phenomena can be traced to excessive pressure drop which occurs across the typical intake valves of the reciprocating pumps. Gas lock is a phenomena wherein the mechanical work done by the subsurface pump is used to compress and expand large gas bubbles trapped inside the pump without any pumping of crude oil being affected. A similar critical condition known as steam lock occurs when steam has been injected into wells in order to stimulate crude recovery.

Naturally, it would be highly desirable to provide an improved check valve construction which would minimize pressure drop across the intake and discharge valves of a positive displacement pump and thus maximize flow through the valve body thereby improving pumping efficiency and eliminating gas lock, steam lock and the other disadvantages noted above with regard to typical check valves presently employed.

Accordingly, it is the principal object of the present invention to provide a check valve wherein the pressure drop across the valve is minimized so as to insure maximum flow through the valve body.

It a particular object of the present invention to provide a check valve as aforesaid which is a single plug check valve.

It is a further object of the present invention to provide a single plug check valve as set forth above which is capable of functioning at all inclined angles of operation.

It is a still further object of the present invention to provide a single plug check valve as aforesaid which is of simple construction and inexpensive to manufacture.

Further objects and advantages of the present invention will appear hereinbelow.

SUMMARY OF THE INVENTION

In accordance with the present invention the foregoing objects and advantages are readily obtained.

The present invention is drawn to an improved single plug check valve having a design which guarantees minimum pressure drop across the valve and thus maximum flow through the valve. The present invention further relates to a process for efficiently pumping a two phase gas mixture which employs the single plug check valve of the present invention.

In accordance with the present invention, the single plug check valve comprises a housing portion of a particular configuration. Generally, the valve housing is in the form of a cylindrical tube and accordingly the present invention will be described in detail with references to a cylindrical housing. It should be appreciated, however, that any other geometric configuration could be employed. Thus, when employing a cylindrical housing the single plug check valve of the present invention will comprise a housing having an internal diameter $D_1$. A valve seat is situated in the housing and defines a first flow area $A_1$ for passing the pumped mixture through the valve seat. A stop is provided in the housing downstream of the valve seat and defines with the housing and the valve seat a chamber. In accordance with the present invention a valve plug is mounted for reciprocal movement in the chamber upon actuation of the positive displacement pump for sealing and unsealing against the valve seat. The valve plug is constructed in a specific manner so as to minimize pressure drop across the valve and thus maximize flow through the valve body. Accordingly, the valve plug has a first diameter portion having a diameter $D_2$ which is adapted to mate with the valve seat for sealing the first flow area $A_1$ when the valve is in the closed position. The first diameter portion is sized in such a manner that it defines with the housing an annular flow area $A_2$ which is substantially at least as large as the flow area $A_1$ defined by the valve seat. By insuring the foregoing relationship between the flow areas $A_1$ and $A_2$, the pressure drop across the valve is minimized and the flow through the valve body is correspondingly maximized. In accordance with a further feature of the present invention, a valve body is provided with a second diameter portion having an external diameter $D_3$ and an internal diameter $D_4$ wherein the external diameter $D_3$ is substantially equal to the internal diameter $D_1$ of the valve housing. The foregoing design insures that the valve plug is properly guided within the valve housing thereby allowing the valve to effectively operate at all single orientations. The passage defined by the internal diameter $D_4$ of the second diameter portion of the valve plug is in communication with annular space $A_2$ by means of an internal passage provided in the valve plug.

The process of the present invention is drawn to a process for pumping a two phase mixture in an efficient manner so as to prohibit the above noted gas lock phenomena. The process of the present invention comprises pumping a two phase gas mixture through a pumping system employing the single plug check valve of the present invention as set forth above.

By employing the single plug check valve of the present invention, pressure drop across the valve is minimized thereby maximizing flow through the valve body which results in maximum pumping efficiency while prohibiting gas lock and steam lock.

DETAILED DESCRIPTION

Figure 1:
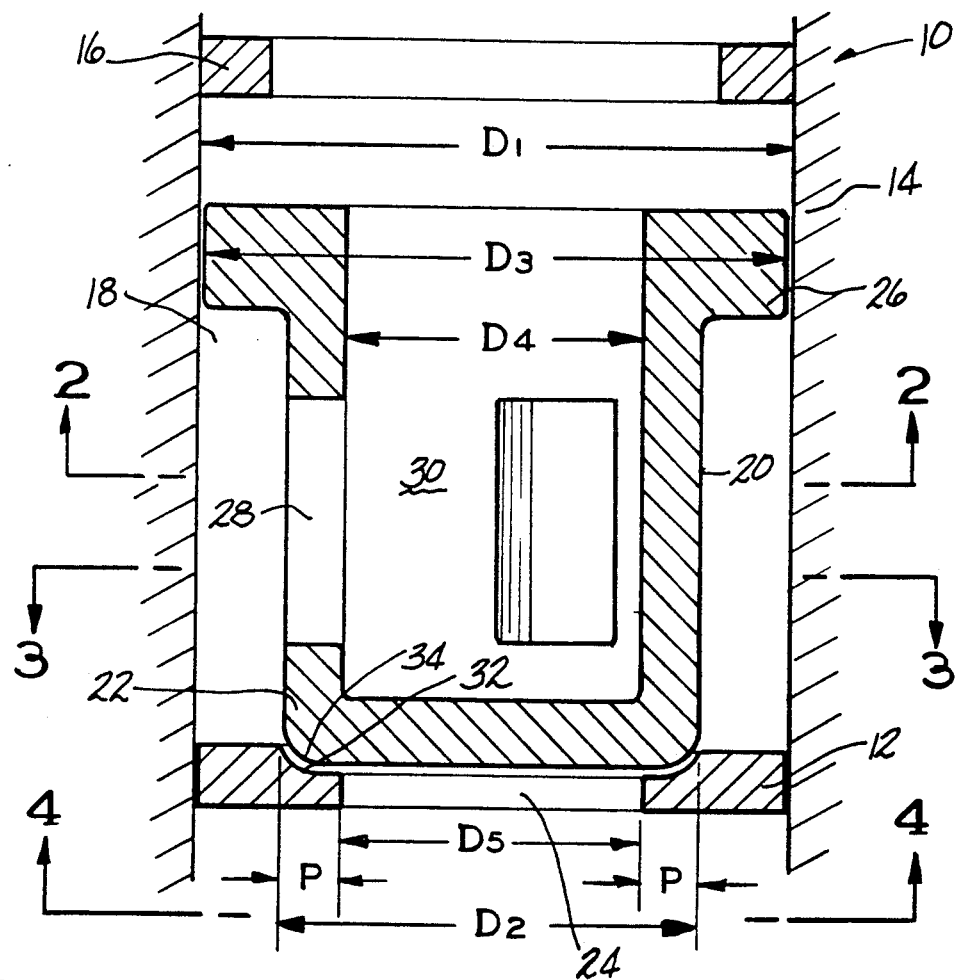
FIG. 1 is a longitudinal sectional view through the single plug check valve of the present invention.

Referring to FIG. 1, a single plug check valve 10 comprises a valve seat 12 which is fixed to a valve housing 14. Spaced from the valve seat 12 and downstream thereof in the direction of flow through the check valve is a stop 16 which defines with the valve seat 12 and the housing 14 a chamber 18. Mounted within the chamber 18 for reciprocal movement between the valve seat 12 and the stop 16 for sealing and unsealing the valve seat 12 is valve plug 20.

Valve plug 20 is provided with a first diameter portion 22 which is adapted to seal on the valve seat 12 so as to cross off the flow passage 24 defined by the valve seat 12. The valve plug 30 includes a second diameter portion 26 which serves to guide the valve plug within chamber 18. The second diameter portion 26 has an external diameter $D_3$ which is sized in such a manner with respect to the internal diameter $D_1$ of the housing so as to minimize any space between the diameter portion 26 and the housing 14 while at the same time allowing free movement of the valve plug 20 within the chamber 18. By sizing the diameter portion 26 accordingly, the valve plug 20 is guided within chamber 18 while at the same time minimizing flow of fluid between portion 26 and the housing 14. This construction insures that the single plug check valve of the present invention may be used at all angle orientations.

The valve plug 20 further includes openings 28 in the first diameter portion which communicate with an internal passage 30 having a diameter $D_4$ for communicating fluid which passes through openings 24 in valve seat 12 through the valve body.

With particular references to FIGS. 1-4, the special design of the valve plug of the present invention which guarantees minimum pressure drop across the valve and thus maximum flow through the valve body will be described. In order to insure minimum pressure drop across the valve and thus maximum flow through the valve, it is a particular feature of the present invention that the first diameter portion 22 of the valve plug 20 define with the valve housing 14 an annular flow area, $A_2$ in FIG. 3, which is substantially at least as large as the flow area, $A_1$ in FIG. 4, defined by the valve seat 12. The annular flow area $A_2$ is equal to the area defined by the housing 14 minus the area of the first diameter portion 22 of the valve plug 20. Thus, annular flow area $A_2$ is defined as follows:

$$A_2 = \pi(D_2/2)^2 - \pi(D_2/2)^2$$

Flow area $A_1$ is defined as follows:

$$A_1 = \pi(D_5/2)^2$$

Accordingly, as $A_1 = A_2$:

$$\pi(D_5/2)^2 = \pi(D_1/2)^2 - \pi(D_2/2)^2$$

With reference to FIG. 1, it can be seen that $D_5$ is equal to the diameter $D_2$ of the first diameter portion 22 of plug 20 less than the overlap or seating surface of the diameter portion 22 on the valve seat 12. Thus:

$$D_2 = \sqrt{D_1^2 - D_5^2}$$

where:
$D_5 = D_2 - 2p$

By insuring the foregoing relationship, the pressure drop across the valve is minimized and the flow through the valve body is maximized.

Figure 2:
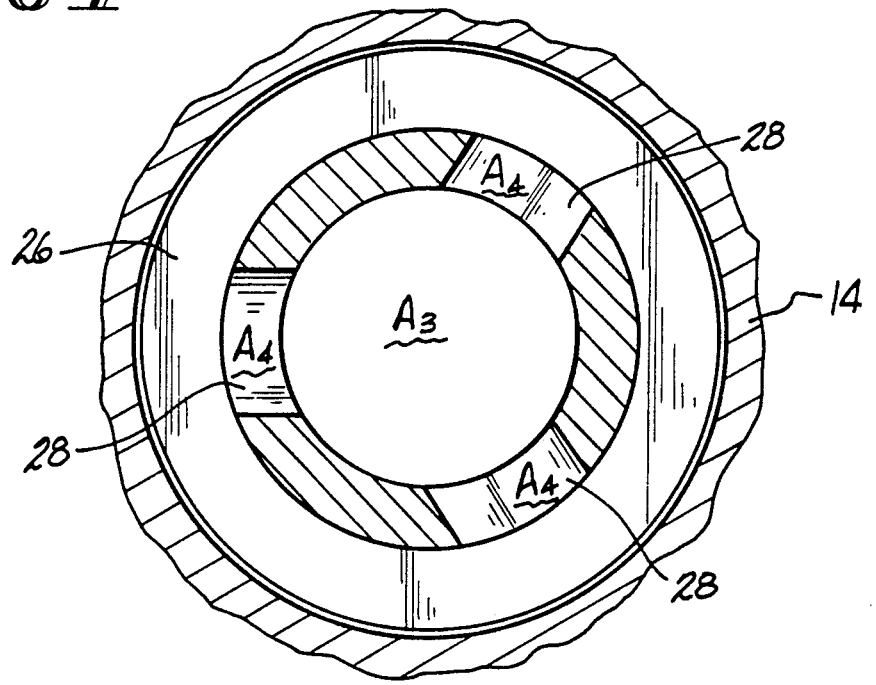
FIG. 2 is a cross sectional view of the single plug check valve of the present invention taken along line 2—2 of FIG. 1.
Figure 3:
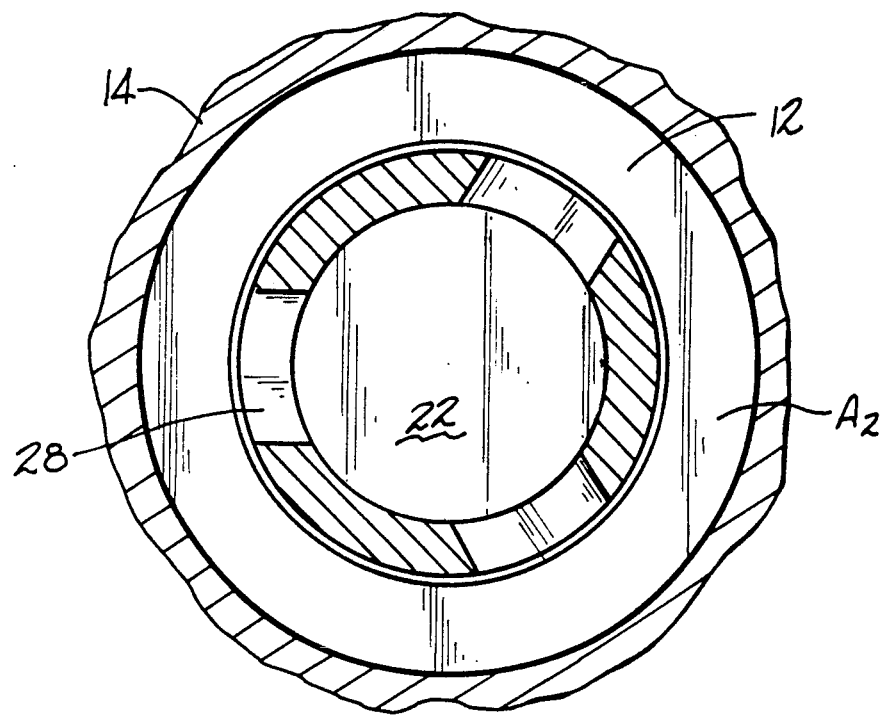
FIG. 3 is a cross sectional view of the single plug check valve of the present invention taken along line 3—3 of FIG. 1.
Figure 4:
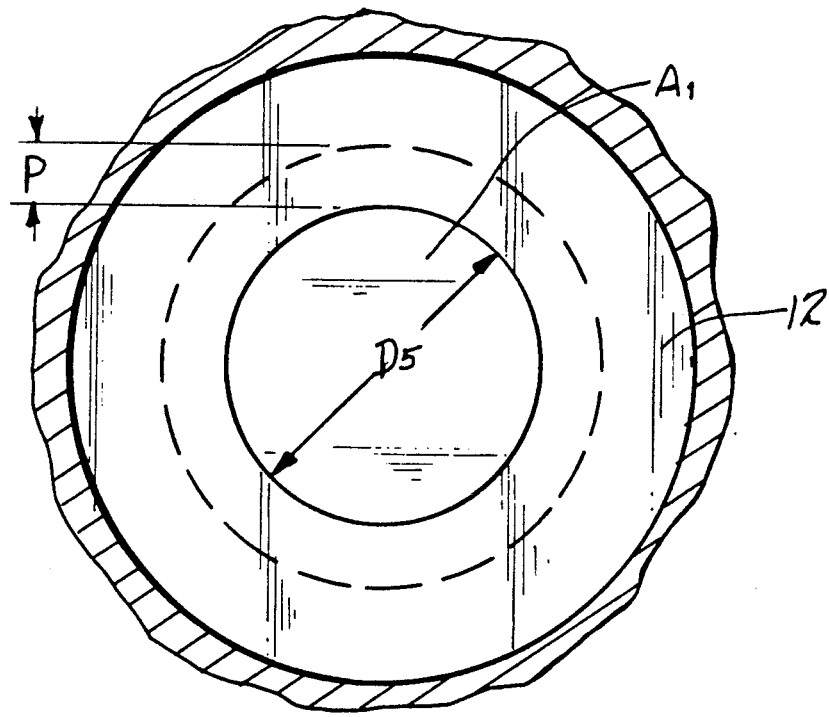
FIG. 4 is a cross sectional view of the single plug check valve of the present invention taken along line 4—4 of FIG. 1.

In addition to the foregoing, it is preferred that the flow area as defined by openings 28 and internal passage 30 be substantially at least as equal in size to flow area $A_1$ and $A_2$ described above. Accordingly, the flow area of passages 28, $A_4$ as shown in FIG. 2, and the flow area, $A_3$ as shown in FIG. 2, of the internal passage 30, should be substantially at least as large as the flow areas $A_1$ and $A_2$ in order to insure minimum pressure drop as the fluid being pumped is passed through these openings.

In order to further maximize pumping efficiency, the surfaces of the vale plug, valve body, valve seat and valve stop which will be contacted by the flowing fluid should be as smooth as possible so as to reduce drag and thereby avoid any pressure drop as the fluid passes over these surfaces. In addition, the surfaces of the valve plug and valve body which contact each other, namely, external diameter portion 26, should be coated with abrasion resistant, low friction material so as to reduce wear and insure efficient operation.

In addition to the foregoing, in order to maximize proper contact between the sealing surfaces of the valve plug 20 and the valve seat 12, it is desirable to form the sealing surface as spherical zones 32 and 34 and preferably having a radius of curvature equal to the radius of the internal diameter of the valve housing 14.

By providing a single plug check valve as aforesaid, pressure drop across the valve is minimized thus maximizing flow through the valve body thereby maximizing pumping efficiency and prohibiting the phenomena of gas lock and/or steam lock.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A check valve comprising a housing having an internal diameter $D_1$; a seat fixed in said housing, said seat defining a first flow area $A_1$; a stop fixed in said housing and spaced from said seat so as to define with said housing and said seat a chamber; and a valve plug mounted for reciprocal movement in said chamber, said valve plug having (1) a first diameter portion having a diameter $D_2$ adapted to mate with said seat for sealing said first flow area $A_1$, said first diameter portion defining with said housing a second annular flow area $A_2$, (2) a second diameter portion having an external diameter $D_3$ and an internal diameter $D_4$ wherein $D_3$ is substantially equal to $D_1$ and $D_4$ defines a third flow area $A_3$ and (3) an internal passage connecting $A_2$ with $A_3$ wherein said internal passage defines a flow area $A_4$ wherein $A_3$ is greater than or equal to $A_4$ which is greater than or equal to $A_2$ which is greater than or equal to $A_1$ whereby the pressure drop across the valve plug is minimized.

2. A check valve according to claim 1 wherein $A_1$ has a diameter $D_5$ wherein $D_5$ is less than $D_2$ wherein $D_2 - D_5 = 2p$ where p is the sealing surface of the seat.

3. A check valve according to claim 2 wherein the sealing surface of the seat and the valve plug have corresponding shapes in order to insure proper sealing.

4. A check valve according to claim 1 wherein $$D_2 = \sqrt{D_1^2 - D_5^2}.$$

* * * * *